Patented Apr. 19, 1949

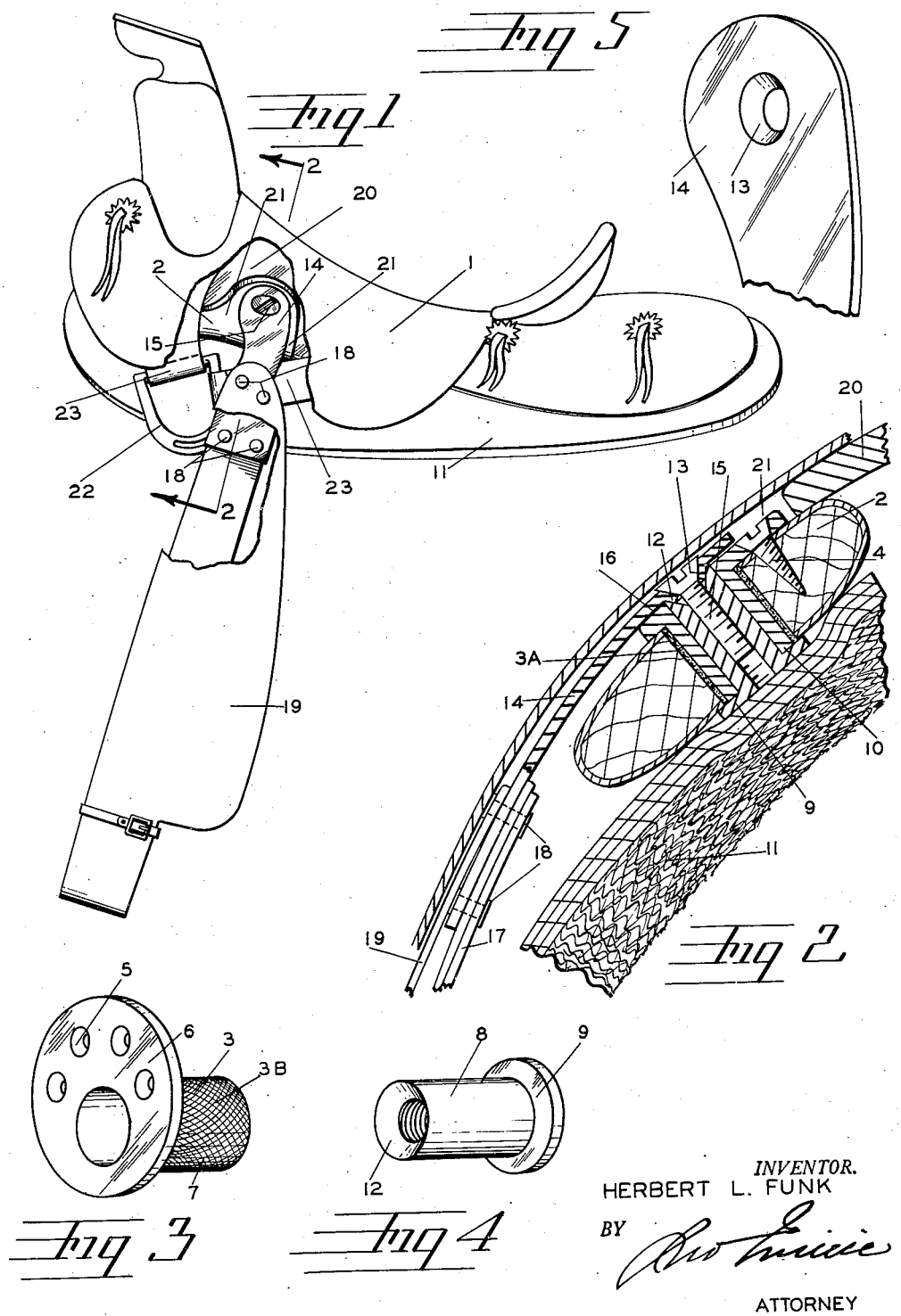

2,467,663

UNITED STATES PATENT OFFICE 2,467,663

SADDLE STIRRUP HANGER

Herbert L. Funk, Philomath, Oreg.

Application August 8, 1947, Serial No. 767,484

5 Claims. (Cl. 54—46)

This invention relates to saddles and is particularly adapted to be used in connection with saddles used in range riding, breaking or bucking saddles and work saddles.

The primary object of the invention is to attach the stirrups to the saddle in such a manner as to increase the freedom of stirrup swing and their operation without interference from the rigging.

A further object of the invention is to increase the swing of the stirrup with a minimum of effort and without bending or deforming the stirrup leathers.

These and other incidental objects will be apparent in the drawings, specification and claims.

Referring to the drawings:

Figure 1 is a side view of a working saddle, partially broken away for illustrating my new and improved stirrup mounting.

Figure 2 is an enlarged fragmentary sectional view of the stirrup mounting, taken on line 2—2 of Figure 1.

Figure 3 is a perspective view of the mount fitting which is adapted to be mounted within the saddle tree.

Figure 4 illustrates in perspective the fitting that is associated with the fitting indicated in Figure 3 and that is fixedly secured to the stirrup hanger.

Figure 5 is a fragmentary perspective view of the upper end of the stirrup hanger.

In the drawings:

The saddle is indicated in general by numeral 1 and is of the type that is employed for range riding, bucking, breaking and working. The saddle tree is indicated at 2 and is of the usual construction. Fixedly mounted within the saddle tree 2 is the fitting or bearing 3 which is secured in place by the screws 4 passing through the holes 5 located in the offset flange 6 forming part of the sleeve 7 of the fitting 3. The fitting 3 is further secured within the saddle tree 2 by the knurling 3B and cement 3A.

A spindle fitting 8 is journalled within the sleeve 7 and has a flange 9 for contacting the end 10 of the sleeve 7. This flange also rests upon the saddle skirt 11 best illustrated in Figure 2. The opposite end of the spindle 8 has a cone shaped bearing 12 formed therein, adapted to receive the cone 13 formed on the underside of the hanger 14 (Figs. 4 and 5).

The hanger and its cone 13 are maintained within the cone recess 12 of the spindle 8 by the screw 15, which is threaded within the spindle. Sufficient clearance 16 is provided between the hanger and the flange 6 to permit freedom of movement. The stirrup leathers 17 are secured to the hanger 14 by the rivets 18. The fender portion 19 is also secured to the upper rivets 18. I do not wish to be limited to any particular type of stirrup straps or fenders as any well known stirrup assembly may be employed.

By observing Figure 1 it will be noted that the hanger and stirrup assembly has considerable freedom of swing. The sub-seat 20 of the saddle is cut away at 21 allowing the hanger 14 to operate in this space freely swinging through the action of the spindle 8 revolving in the bearing 7 of the fitting 3.

With my new and improved stirrup mounting it will be noted that the same comes over the top of the rigging ring 22 and the rigging straps 23. This is what allows for the freedom of operation or swing of my stirrup mounting and it is, as stated above, the primary object of my invention.

I do not wish to be limited to the exact mechanical details as other mechanical equivalents may be substituted still coming within the scope of my claims.

What I claim as new is:

1. In a saddle comprising a tree and a seat including a sub-seat, an aperture formed in said tree beneath said seat and adjacent said sub-seat, an internally threaded bearing sleeve mounted in said aperture and having an outwardly extending flange underlying said tree, the outer end of said sleeve being conically recessed, a stirrup hanger transversely overlying the outer end of said sleeve and having an aperture aligned with the threaded bore of said bearing sleeve, and a conically headed screw extending through said aperture and threaded in said bearing sleeve to bind said hanger between the cone of said screw head and the conical wall of said recess.

2. A saddle construction as set forth in claim 1, wherein the overlying flange of said outer sleeve is rigidly secured to said tree.

3. A saddle construction as set forth in claim 1, wherein a sleeve is telescoped around said bearing sleeve and has an outwardly extending flange overlying said tree, the outer surface of said sleeve being roughened to adhere to the wall of the tree aperture.

4. A saddle including a tree, a seat, a sub-seat, an aperture formed in the tree beneath said seat and adjacent said sub-seat, a bearing sleeve fitted in said aperture and having a flange at its outer end which overlies the tree and is secured thereto, a rotatable sleeve fitted in the bearing sleeve, said rotatable sleeve having a flange at its inner end to overlie the inner end of the bearing sleeve and tree, the outer end of the rotatable sleeve extending slightly above the outer end of the bearing sleeve and formed with a cone-shaped recess, a stirrup hanger overlying the upper ends of the bearing sleeve and rotatable sleeve, said hanger having a cone-shaped projection to engage in the cone-shaped recess in the rotatable sleeve, and a screw engaging an opening formed in the hanger and through the cone-shaped projection and a threaded opening formed in the rotatable bearing whereby the stirrup hanger may oscillate with the rotatable sleeve independently of the bearing sleeve.

5. A saddle comprising a tree and a seat including a sub-seat, an aperture formed in said tree, a bearing composed of an inner sleeve and an outer sleeve, mounted in the aperture, the inner sleeve having a flange engaging the inner surface of the tree and overlapping the inner end of the outer sleeve, the outer sleeve having a flange to engage the outer surface of the tree and secured thereto, a stirrup hanger overlapping the outer flange of the outer sleeve and the outer surface of the inner sleeve, and a screw securing the stirrup hanger to the inner sleeve to form a pivotal connection between the stirrup hanger and the bearing.

HERBERT L. FUNK.

REFERENCES CITED

The following references are of record in the file of this patent:

UNITED STATES PATENTS

| Number | Name | Date |
| --- | --- | --- |
| 2,207,982 | Hamley | July 16, 1940 |

FOREIGN PATENTS

| Number | Country | Date |
| --- | --- | --- |
| 14,289 | Great Britain | 1886 |